Dec. 14, 1965   J. E. GUTRIDGE ETAL   3,223,052
CUSHIONED LOW LEVEL RAILWAY VEHICLE
Filed Dec. 4, 1963   10 Sheets-Sheet 2
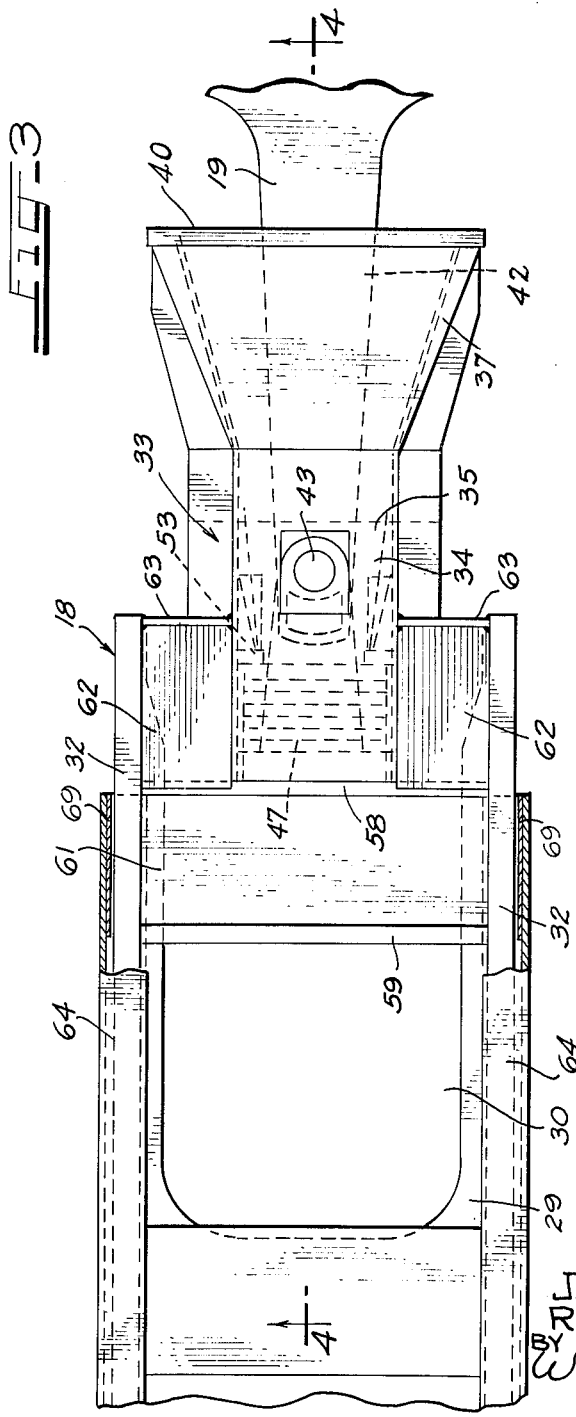
INVENTORS
JACK E. GUTRIDGE
RALPH B. BERGSTRAND
BY

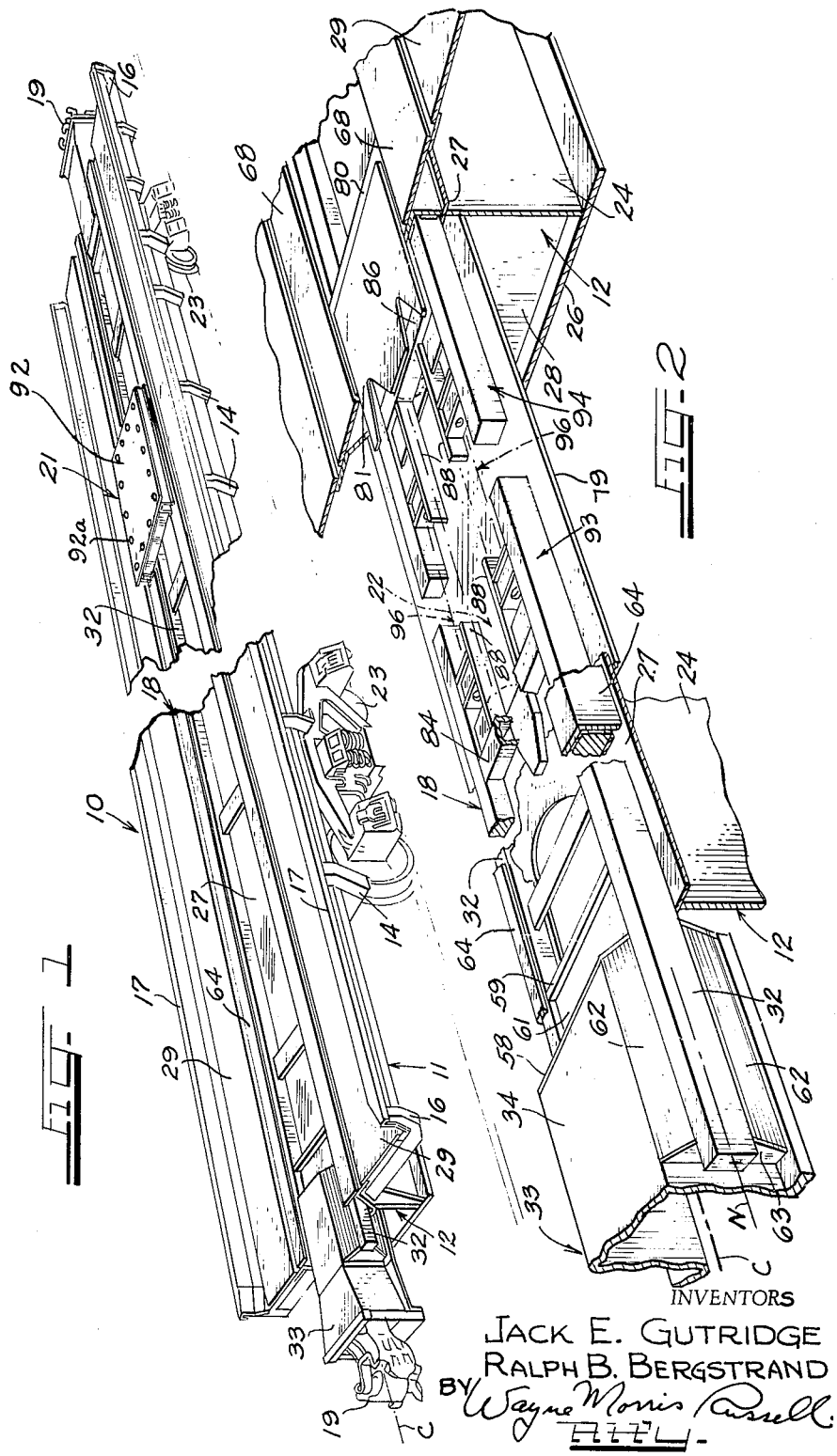

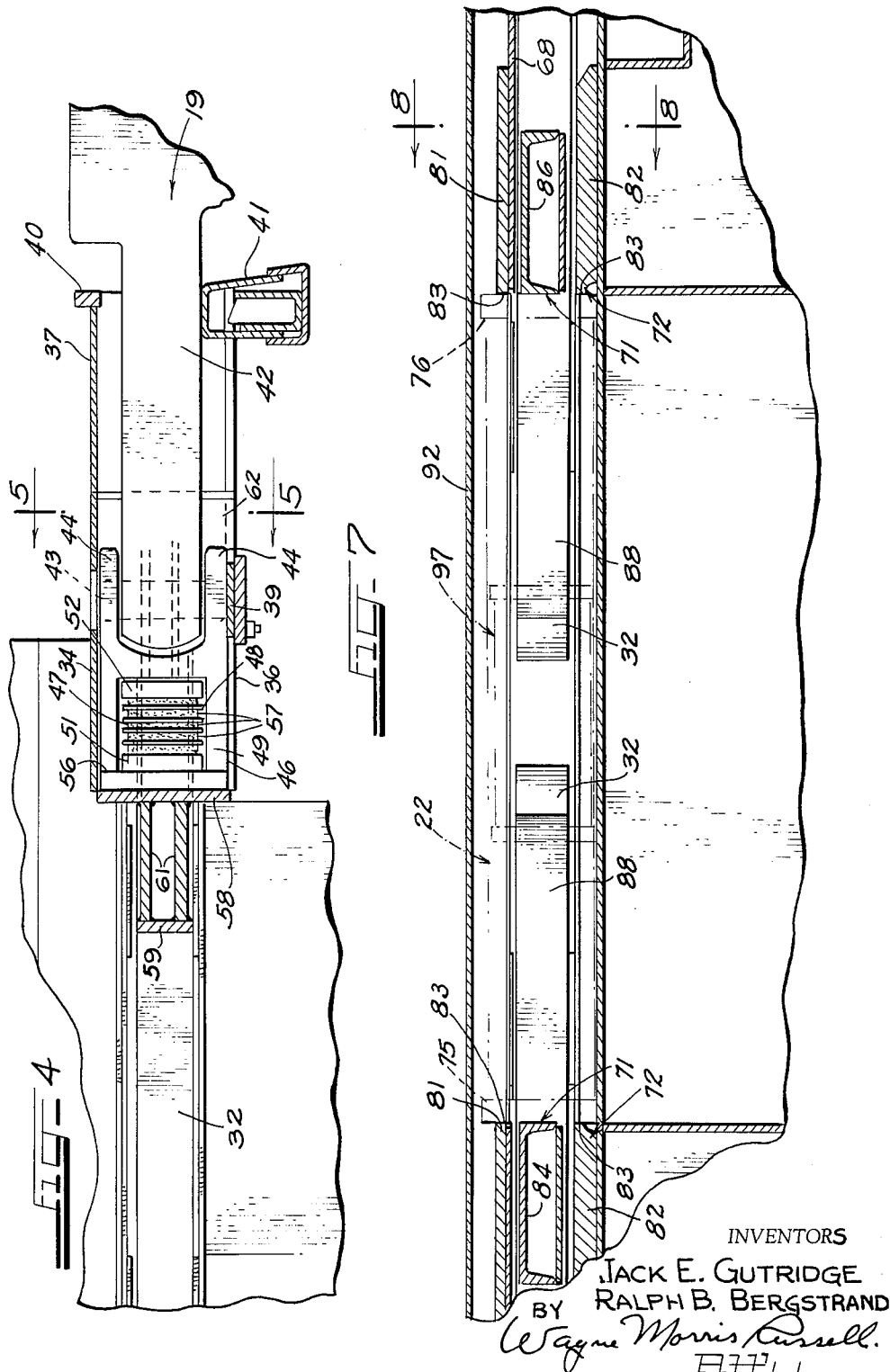

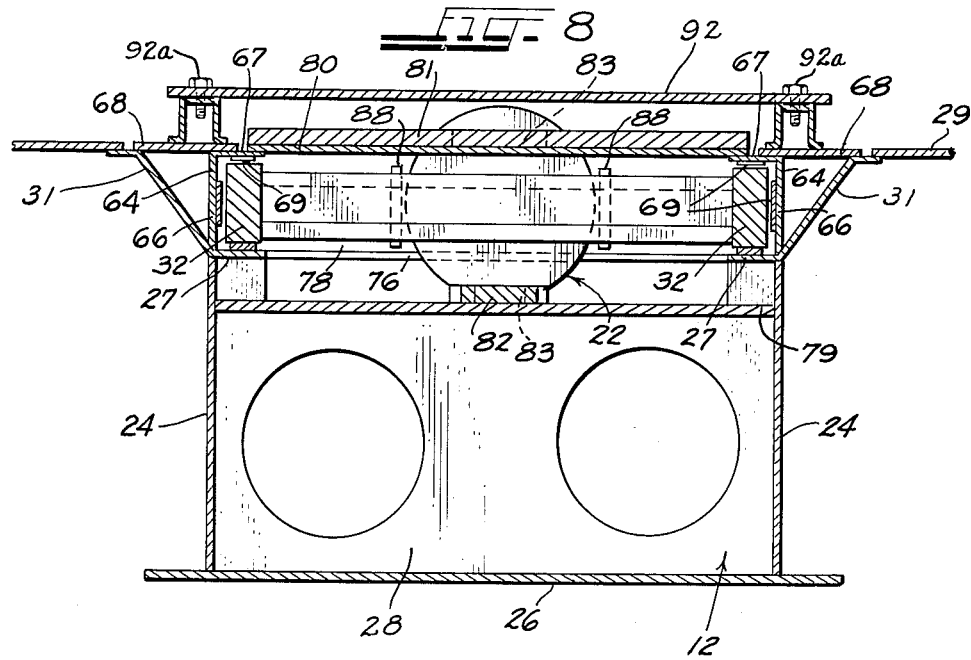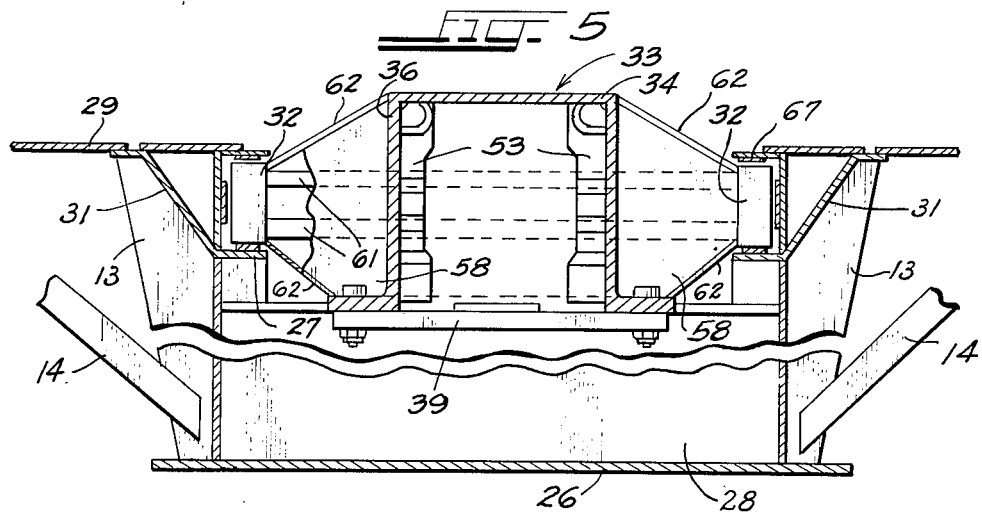

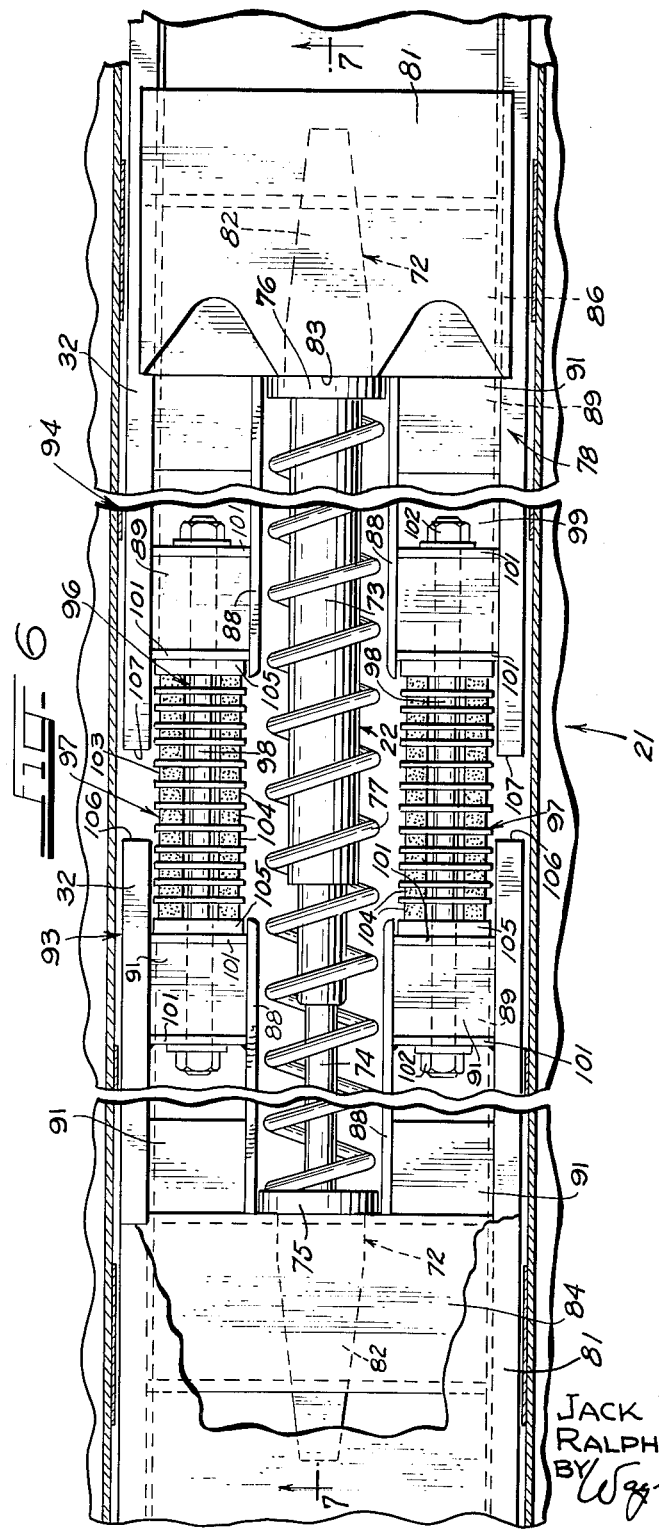

Dec. 14, 1965  J. E. GUTRIDGE ETAL  3,223,052
CUSHIONED LOW LEVEL RAILWAY VEHICLE
Filed Dec. 4, 1963  10 Sheets-Sheet 6
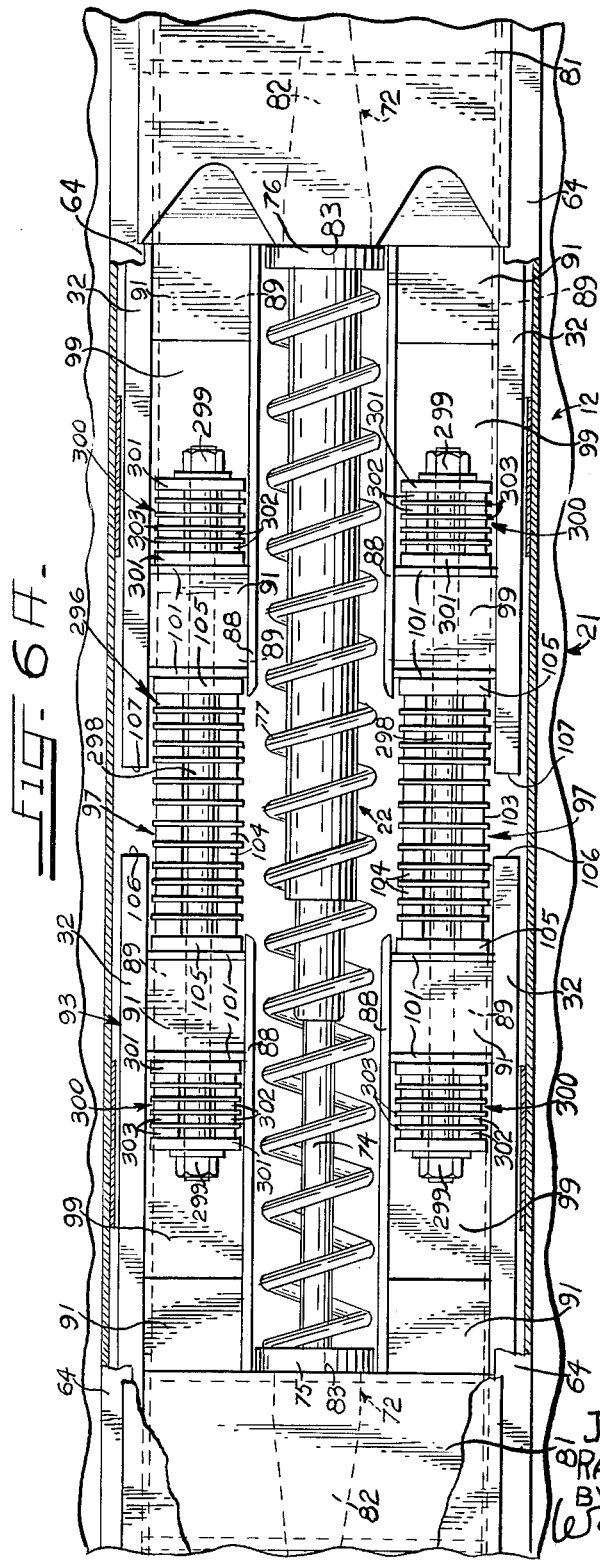
INVENTORS
JACK E. GUTRIDGE
RALPH B. BERGSTRAND
BY Wayne Morris Russell
ATT'Y.

Dec. 14, 1965     J. E. GUTRIDGE ETAL     3,223,052
CUSHIONED LOW LEVEL RAILWAY VEHICLE
Filed Dec. 4, 1963                         10 Sheets-Sheet 7
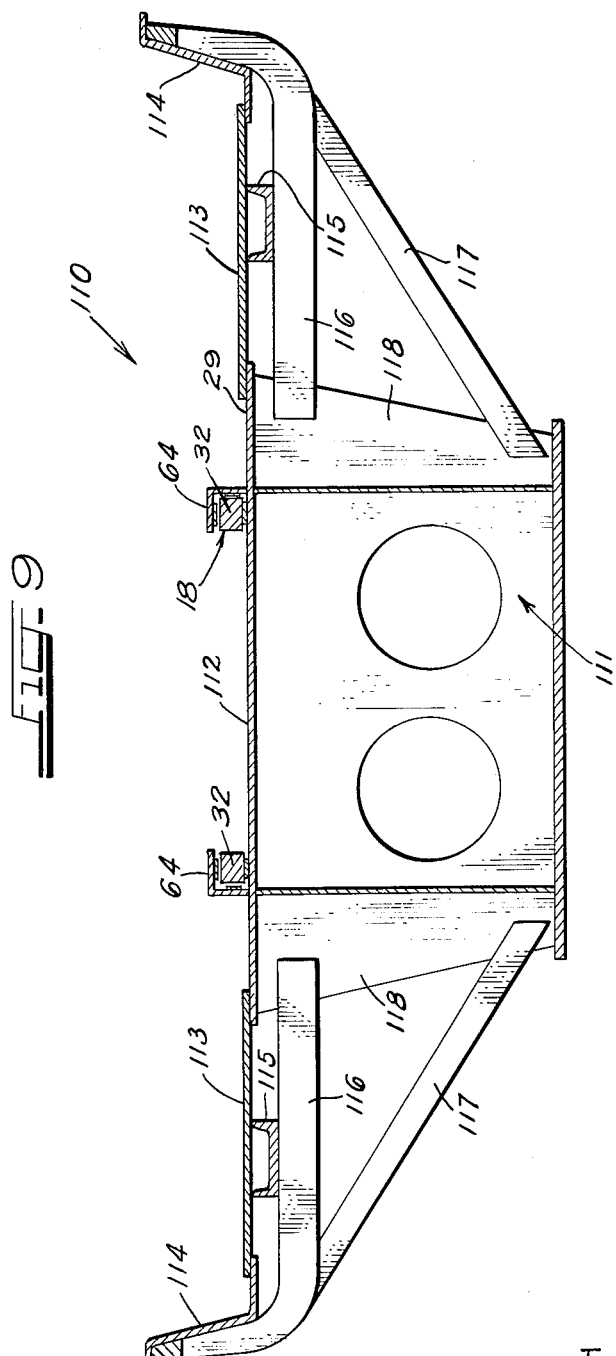
INVENTORS
JACK E. GUTRIDGE
RALPH B. BERGSTRAND
BY Wayne Morris Russell

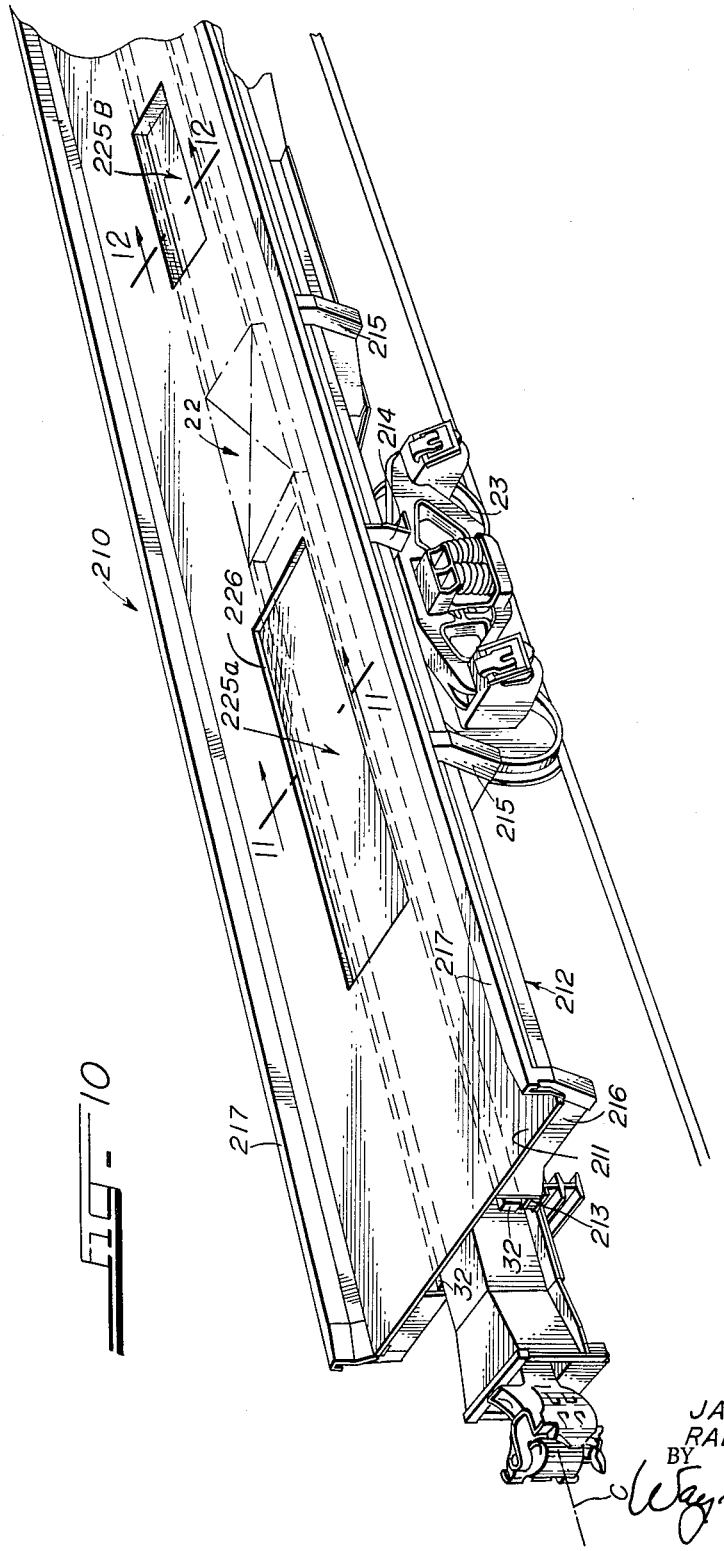

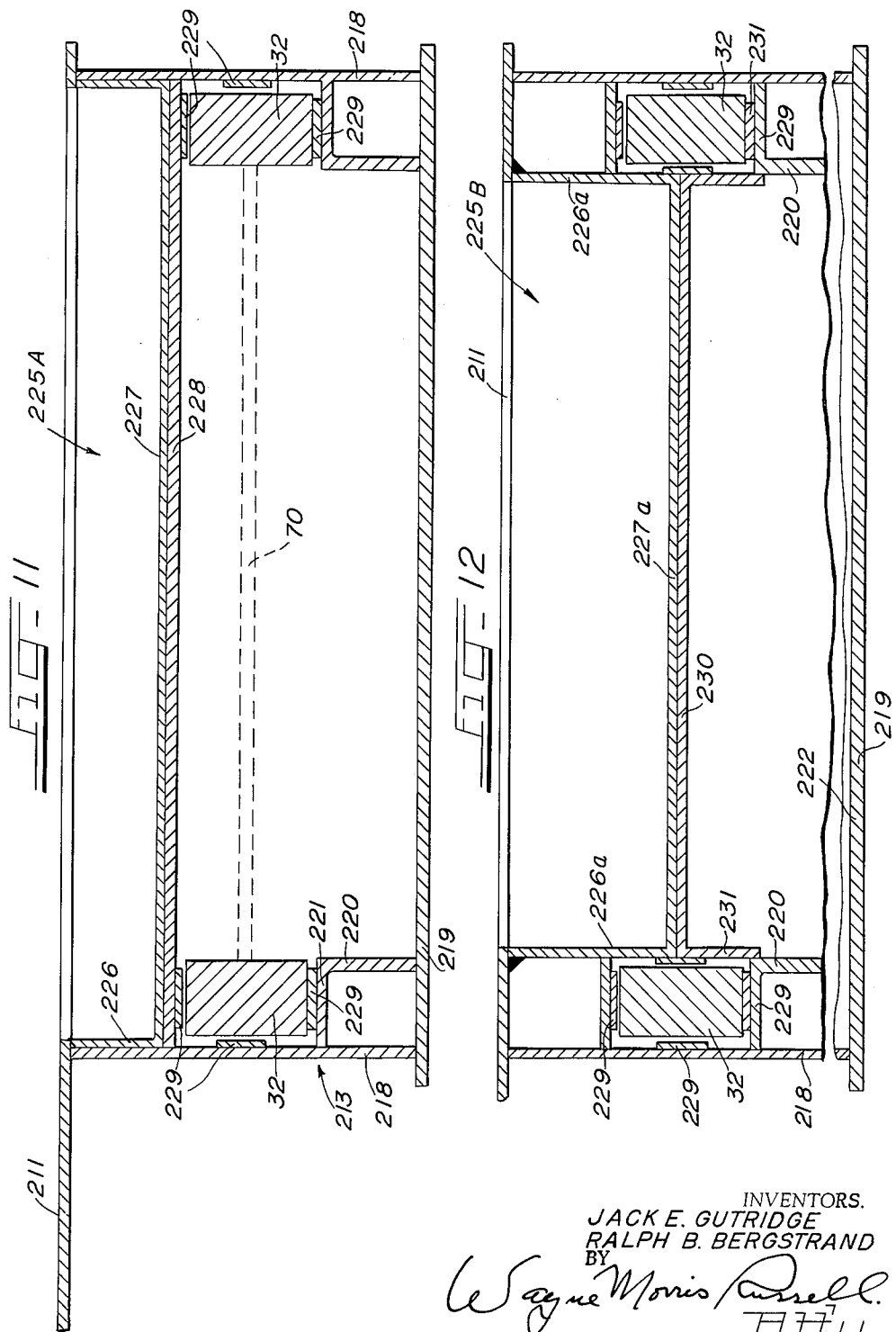

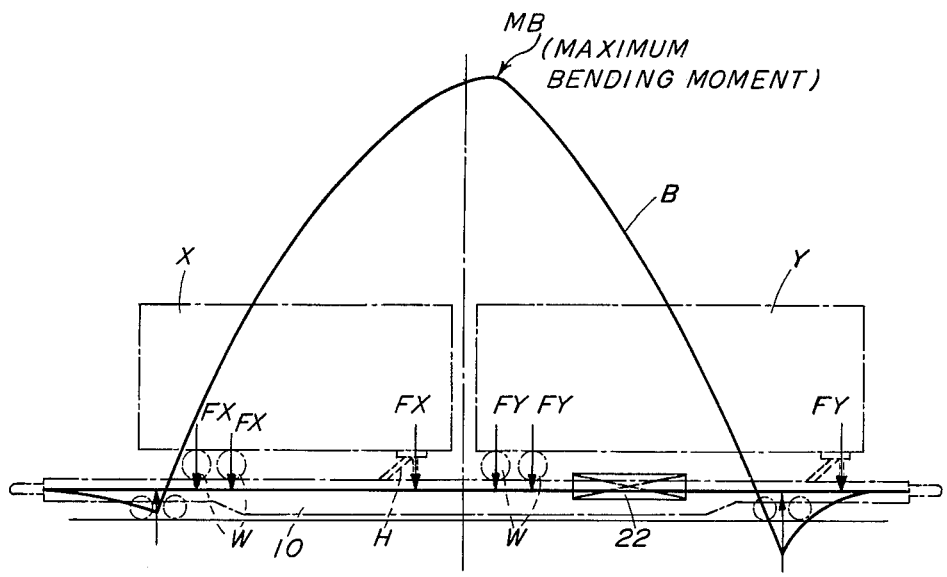

3,223,052
CUSHIONED LOW LEVEL RAILWAY VEHICLE
Jack E. Gutridge, Dyer, Ind., and Ralph Bergstrand, Homewood, Ill., assignors to Pullman Incorporated, Chicago, Ill., a corporation of Delaware
Filed Dec. 4, 1963, Ser. No. 329,343
10 Claims. (Cl. 105—454)

The present invention is a continuation-in-part of United States patent application Serial No. 252,131, filed January 17, 1963, now abandoned, relates to railway car cushion underframes and more particularly to a new and improved sliding sill and cushioning arrangement embodied in a railway car cushion underframe.

Railway car cushion underframes generally comprise a sliding sill which is detachably mounted on the underframe for length-wise movement thereof. Mounted on the ends of the sliding sill are the usual couplers and disposed between the underframe and the sliding sill is a cushion or shock absorbing device which serves during its travel to control the energy transmitted to the car body and lading supported thereon upon shock impact at the couplers.

Heretofore, the sliding sills have generally been constructed of structural components arranged to form a column having an open box-like section. The open section sliding sill is generally sized so as to be slidable within and occupy substantially all of the cross-sectional area of the conventionally employed box-like section of the stationary center sill. In order to minimize the stresses within the sliding sill upon shock impact these prior cushion underframe cars are constructed so that the neutral axes of the box-section stationary sill and the open section sliding sill are maintained in close proximity to the required line of draft of the coupler. This line of draft is fixed above the track by regulations in order to maintain a uniform coupler height.

In recent years the load carrying capacity of cars has been increased by lowering the height of the floor above the track such that difficulties have been encountered in adapting such low floor level cars to cushion underframe construction. The difficulty stems primarily from the fact that as the floor level is lowered the stationary sill is correspondingly lowered so that the neutral axis of the center sill and that of the open section sliding sill slidably confined therein are displaced downwardly. Thus, in order to maintain the couplers at the required line of draft, the ends of the sliding sill are offset from the remainder thereof. This offsetting or eccentricity of the ends of the sliding sill results in the sliding sill being subject to bending movements tending to buckle the same upon severe shock impact in buff, especially at the couplers.

The aforementioned low level car designs are primarily in the form of flat deck piggyback cars wherein it is preferred to avoid a substantial projection of structure upwardly from the deck which would interfere with tractor operation along the deck or efficient container loading thereon. Thus if an attempt is made to use a straight column open section sliding sill in such a car, the sill will project substantially above the car deck if its neutral axis is to be maintained in proximity to the line of draft.

Moreover, difficulties are also encountered in adapting cushion underframe flat cars having floor levels at the more or less standard height of 41 inches to piggyback transporting of trailers. As is well known, such piggyback flat cars are provided with lengthwise spaced trailer stanchions which are located on the center portion of the car. In the erect operative position, the stanchions serve to hitch and support the trailer on the car.

The structural requirements of these stanchions are such that when mounted on the floor of the car, the collapsed stanchions extend above the floor level to the extent that there is insufficient clearance for the tractors which are employed to haul the trailers to pass thereover. Any effort to form recesses to accommodate the collapsed stanchions to obtain the required clearance is obviated by the nature of the box-like open section sliding sill structure which includes a horizontal web lying in close proximity to the underside of the floor. Accordingly, it is common practice to provide riser boards in the vicinity of the stanchions to raise the tractors over the stanchions. The use of riser boards is not efficient inasmuch as they create localized humps which require that the loading and unloading of the trailers be slowed down.

Furthermore, railway cars are concurrently being lengthened to increase the load carrying capacity thereof. To withstand the load stresses associated with such increased capacity railway cars, the center sill of the underframe may be formed as a fishbelly in which the intermediate section between the car trucks is of a greater depth than the end sections. In the fishbelly construction the neutral axis of the center sill is generally eccentrically disposed below the coupler line of draft (substantially corresponding to the line of impact at the couplers) such that the center sill is subject to bending upon impact thereto at the couplers.

In the prior cushion underframe railway car construction the cushion unit which interacts between the sliding sill and the car underframe to absorb a portion of the energy of impact has conventionally been located intermediate the ends of the car and in close proximity to the point at which maximum bending may occur. This condition is disadvantageous because it results in transmitting the resultant force of the impact force on the couplers and the resisting force of the cushion unit at the point of maximum bending. Thus, under some conditions of car loading and impact, the force of the latter may be such as to bend the underframe, causing car or lading damage.

It is an object of the invention to provide a sliding sill constructed and arranged for application in cushion underframe cars in a manner obviating the difficulties encountered heretofore by maintaining the neutral axis of the sliding sill in proximity to the coupler line of draft.

It is a further object to provide a sliding sill for a cushion underframe railway car wherein the sliding sill is constructed and arranged for use with railway cars of different floor heights, and permits the formation of recessed portions along the center of car capable of accommodating the width of a trailer stanchion therein and of such depth to provide adequate clearance for the tractors to pass over the stanchions.

It is still a further object to provide a sliding sill for cushion underframe railway cars wherein the sliding sill is constructed and arranged for use in railway cars having different floor heights and is capable of being mounted in cars of different floor heights so that the sliding sill neutral axis lies substantially along the coupler line of draft.

It is still a further object of the invention to provide a cushion underframe railway car wherein the neutral axis of the underframe is eccentric with respect to the coupler line of draft with a cushion device located so that the resultant force of impact at the cushion is transmitted to the car at a location displaced from the point at which the maximum bending moment occurs.

It is a further object to provide a sliding sill constructed and arranged for mounting above or at least adjacent the top of a stationary center sill of a railway car.

It is still a further object to provide a sliding sill formed of a solid section construction, in contrast to the open section construction as employed heretofore, thereby minimizing the total cross-sectional area occupied by the sliding sill on the underframe.

It is another object to provide a sliding sill constructed to provide laterally spaced duplex sill members conjointly supporting the couplers therebetween on the opposite ends thereof.

It is still a further object to provide a sliding sill incorporating a single cushioning arrangement disposed between the coupler ends of the sliding sill for relieving the stresses through the length of the sliding sill upon buff impact.

It is still another object to provide a sliding sill for a cushion underframe car employing a cushion device of the type having a substantially uniform resisting force for the full length of travel thereof where the sliding sill includes a single resilient cushioning arrangement disposed between the coupler ends thereof for relieving the stresses through the length of the sliding sill upon buff impact and wherein the sliding sill is constructed and arranged to utilize a portion of the energy absorbing capacity of the cushion underframe cushion device during the travel of the resilient cushioning arrangement.

It is still another object to provide a new and novel cushion pocket arrangement for housing the cushion device which is compact and utilizes a space between the sides of the sliding sill.

In the drawings:

FIG. 1 is a fragmentary perspective view of a railway car embodying the present invention.

FIG. 2 is a fragmentary perspective view of the sliding sill and cushion pocket structure of the present invention with some of the parts being broken away to show underlying details of the structure and with the cushion devices employed therein merely diagrammatically illustrated in phantom lines.

FIG. 3 is a fragmentary plan view of the end of the railway car showing in particular the coupler assembly attachment to the sliding sill.

FIG. 4 is a cross-sectional view taken substantially along the lines 4—4 of FIG. 3.

FIG. 5 is a cross-sectional view taken substantially along the lines 5—5 of FIG. 4 with the coupler being omitted.

FIG. 6 is a fragmentary top plan view of the cushion pocket portion of the railway car showing the components of the sliding sill and the cushion devices in the neutral or normal positions thereof.

FIG. 6A is a view similar to FIG. 6, but showing resilient draft stress relieving means in addition to the resilient buff stress relieving mean incorporated in the tie means connecting the sliding sill sections;

FIG. 7 is a longitudinal sectional view taken substantially along the lines 7—7 of FIG. 6.

FIG. 8 is a cross-sectional view taken substantially along the lines 8—8 of FIG. 7.

FIG. 9 is a cross-sectional view of a railway car showing another embodiment of an underframe structure and showing the sliding sill structure of the present invention mounted thereon.

FIG. 10 is a fragmentary perspective view of a cushion underframe railway car in which the floor is of a substantially planar construction and is located at a level higher than that illustrated in the embodiment of FIGS. 1–7, and FIG. 9 and showing the stanchion accommodating recesses formed therein of which one of the recesses is sized to accommodate a wide stanchion and of which the other is sized to accommodate a narrower stanchion.

FIG. 11 is a cross-sectional view taken generally along the lines 11—11 of FIG. 10 and shows in particular the center sill construction with the wide recess formed therein and shows the relationship of the latter with the sliding sill supported within the center sill.

FIG. 12 is a cross-sectional view taken generally along the lines 12—12 of FIG. 11 and shows in particular the center sill construction with the narrower of the recesses formed therein and shows the relationship of the latter with the sliding sill supported within the center sill.

FIG. 13 is a schematic illustration of the cushion underframe railway car constructed in accordance with the present invention and illustrating in particular the relationship of the location of the cushion unit on the underframe with the maximum bending moment curve which is superposed over the schematic railway car structure in a heavy full line.

Referring now to the FIGS. 1–8, the sliding sill and cushioning arrangement of the present invention is illustrated for the purpose of description as being embodied in a railway car 10 of the flat car type adapted for use in piggyback transporting operations. It is to be understood, however, that the structure of the present invention may be employed in various different types of cars, such as box cars and the like, wherein it is desired to utilize the results obtainable from the cushion structure employed.

The railway car 10 includes generally an underframe 11 formed as a beam structure including a center sill 12 from which there extends cross-bearers 14, bolsters 15, and end sills 16 on the outer ends of which there is fixed the side sills 17. Slidably supported on the underframe 11 for relative lengthwise movement thereof is a sliding sill 18 which mounts the couplers 19 on the opposite ends thereof. Disposed between the sliding sill 18 and the car body or underframe 11 is a cushion arrangement 21 including a cushion device 22 which is operatively associated with the sliding sill 18 and the underframe 11 such that upon shock impact at either of the couplers 19 in buff or draft the sliding sill 18 moves relatively to the car body 11 in the direction of the impact to retract the cushion device 22 for its full length of travel. During such travel the cushion device 22 absorbs a sufficient portion of the energy of impact to protect the car body and the lading from damage.

The center sill 12 may be of a fishbelly construction wherein the portion of the center sill between the wheel trucks 23 is formed of a deeper section than the end sections. The center sill 12 (FIGS. 2, 5–8) includes transversely spaced vertical side plates 24 across the bottom edges of which there is fixed a bottom cover plate 26 and across the top edges of which there is fixed a top cover plate 27. The center sill 12 is suitably reinforced along its length by tie plates 28 which are generally spaced in alignment with the opposing cross bearers 14 extending from the opposite sides of the center sill 12.

In the illustrated flat car construction of FIGS. 1–8 in which the present invention is embodied the center sill 12 is constructed to facilitate a car construction capable of supporting a floor or deck 29 at different heights above the track. To this end, as shown, the floor 29 on which the trailer wheels are adapted to be supported during piggyback transport of the trailers is offset upwardly with respect to the top cover plate 27 to obtain the height desired. Should, however, the floor height requirements be lower, it is readily apparent that the degree of offset may be varied or may be eliminated, in which latter case the floor is maintained at a level substantially horizontally aligned with the top cover plate 27 as shown in FIG. 9.

The sliding sill 18 which is mounted for lengthwise movement on the underframe 11 includes generally a pair of laterally spaced sliding sill members 32 supporting coupler assemblies 33 therebetwen at the opposite ends. The sliding sill members 32 in the preferred form illustrated are each formed from structural components having a solid cross-section capable of withstanding the tension and compression loading imparted thereto during operation of the car. In accordance with accepted practice the total solid cross-sectional area of the pair of sliding sill members 32 is maintained about equal to the solid cross-sectional area of the conventional Z-section center sill or about 24 square inches which is accepted as being the minimum to withstand the destructive forces applied thereto.

In the preferred embodiment shown each of the sliding sill members 32 is formed from bar stock, each bar being of equal rectangular section in which the total cross-sectional area of the two bars 32 is maintained substantially at or above the accepted minimum cross-sectional area. The height and width dimensions resulting in the desired cross-sectional area are preferably selected so that the sliding sill 18 is readily accommodated in the space available on the underframe 11. Thus, for example, as illustrated, in the flat car construction shown in FIGS. 1–8, the height dimension is selected such that the sliding sill 18 is maintained below the upwardly offset portion of the floor 29, the width dimension of course being such as to meet the minimum cross-sectional area requirements. In connection with the height or depth dimension of the sliding sill members 32 as determined by the depth of the center sill, it is to be noted that this dimension is substantially less than the depth of the beam structure of the underframe 11. This relationship of the depth of sliding sill members 32 and the underframe 11 permits the conformity of the sliding sill members 32 to the flexure of the underframe as more fully to be explained hereinafter.

The coupler assemblies 33 (FIGS. 3–5) each include a housing 34 to which the coupler 19 is attached. The housing 34 is formed from a Z-section channel 36 to the forward end of which there is fixed a bell mouth-shaped section 37 which is flared to accommodate the swing of the coupler 19. Fixed across the bottom flanges of the channel 36 is a bottom plate 39. The usual striker plate 40 and the coupler shank support assembly 41 are fixed to the bell mouth section 37.

The coupler 19 may be a conventional straight shank F-type interlocking coupler having a shank 42 which is pivotally supported by means of a stud pin 43 carried by the bifurcated arms 44 of a yoke 46. The yoke 46 includes a draft cushion gear 47 disposed in an opening 48 formed in the inner portion 49 thereof. The draft cushion gear 47 includes spaced follower plates 51 and 52 of which the follower plate 52 engages draft lugs 53 fixed to the sides of the coupler housing 34. The follower plate 51 engages the inner surface of a plate 56 which closes off the opening 48 in the yoke 46 and moves therewith. In operation, upon the application of a draft force at the coupler 19, the yoke 46 mounting the latter by way of the stud pin 43 is moved outwardly. Such outward movement is resisted by the draft cushion gear 47 which includes a plurality of rubber pads 57 or the like disposed between the follower plates 51 and 52, the resistance being made possible by abutment between the follower plate 52 and the draft lugs 53. Thus, during the length of travel of the draft cushion gear 47 to its compressed position, a portion of the energy of draft impact applied at the coupler is absorbed so as to relieve the sliding sill from the tension stresses resulting from the draft impact. Since the draft impacts encountered during train operation are usually of a magnitude requiring only a relatively low energy-absorbing capacity to relieve the tension stresses within the sliding sill only a relatively short cushion travel is employed, for example, about 2½ inches.

Supporting the coupler housing 34 intermediate the sliding sill members 32 is a transversely extending vertical plate 58 fixed to the rear end of the housing 34 and at its ends to the inner walls of the sliding sill members 32. Fixed to the vertical plate 58 and to an inwardly spaced vertical plate 59 are a pair of horizontal plates 61. Fixed along the top edges of the housing 34 and to the respective sliding sill members 32 are attachment plates 62 across the outer ends of which there are fixed gussets 63 which are also fixed to the sliding sill members 32.

The coupler assembly 33 is attached between the sliding sill members 32 such that the longitudinal axes C of the couplers 19 mounted thereon are supported in substantially the same plane as the neutral or impact axes N of the sliding sill members 32 as shown in FIGS. 1 and 2. In this manner the force of impact applied at the couplers 19 is advantageously transmitted substantially along the neutral axis of the sliding sill 18.

The sliding sill 18 and coupler assemblies 33 fixed thereto are mounted on the car underframe 11 so that the impact axis thereof lies substantially along the line of draft which as heretofore mentioned is fixed by regulation to maintain the couplers at a uniform height. In the illustrated railway flat car structure of FIGS. 1–8 this is accomplished by supporting the sliding sill in the depressed center portion of the floor 29 over the cover plate 27 of the center sill 12. In this position, as clearly shown, the sliding sill 18 is disposed within the confines of the depressed central portion of the floor 29.

Guiding the sliding sill 18 for lengthwise movement are a pair of laterally spaced and longitudinally extending guiding angles 64 of which the lower end of the vertical legs 66 are fixed as by welding to the center sill cover plate 27, and the horizontal legs 67 overlie in closely spaced relation the respective sill members 32. The guide angles serve to maintain and guide the sill members 32 for lengthwise movement of the car and may be continuous or formed by a plurality of lengthwise spaced angles. Extending between and fixed to the horizontal legs 67 and the upwardly offset floor sections 29 are intermediate floor plates 68. Wear plates 69 are fixed to the inner surfaces of the angles 64 to facilitate the sliding movement of the sliding sill 18. FIGS. 5 and 8 best illustrate the provision of upwardly inclined side flange portions 31 attached to the cover plate 27 and supporting the adjacent edges of the intermediate floor plates 68 and the main floor plates 29. Gusset plates 13 (FIG. 5) may be applied to the side plates 24 of the center sill as supports for the flange portions 31 and the cross bearers 14.

The flat car 10 illustrated as hereinbefore mentioned is primarily intended for use in piggyback trailer transporting operations. For such use the car is equipped with accessories such as trailer hitches or stanchions and the like (not shown). The trailer hitches are generally movable between a retracted or collapsed position and an erect operative position, and in the retracted position, it is advantageous to maintain the trailer hitch (support unit) in as low a position as possible to provide adequate clearance for the tractors employed to load and unload the trailers. These trailer hitches are located substantially centrally of the side sills 17 of the car 10 so as to be adapted in the operative position thereof to engage the kingpin depending from the underside of the trailer.

In the car body shown the trailer hitches are adapted to be located in the downwardly offset portion of the floor 29 provided by the top cover plate 27 of the center sill 12. The sliding sill 18 of the present invention is advantageously employed to permit this location of the trailer hitches by the provision of the laterally spaced sliding sill members 32 which may be spaced as shown to accommodate the width of the trailer hitches.

In this connection it is to be noted that the lengthwise spacing of transversely extending members 70 which may be fixed between the sill members 32 is such as to accommodate the length of the collapsed stanchion in a manner permitting the sliding sill 18 to slide relatively to the car body for the full length of the cushion unit 22 as more fully to be explained hereinafter.

As is well known railway cars are constructed so as to provide a camber along the length of the underframe and the lading support structure. In the unload condition of the car the camber results in a vertical deflection relative to a horizontal reference plane which may be taken through the bolsters and may be described as an upward vertical deflection between the bolsters relative to the reference plane and a downward deflection at the end of the car projecting beyond the bolsters. When the car structure, which is constructed in the nature of a beam, is loaded, the vertical forces of the load are operative to deflect the beam-like car structure from the normal camber vertically downwardly relative to the reference plane between the bolsters. The amount of deflection along the length of the car in the loaded condition will depend upon the longitudinal distribution of vertical forces applied by the load.

Heretofore, the deflection of the underframe and lading supporting structure has caused difficulties in the operation of the conventional sliding sills which are formed of a hat section and the like so as to impart rigidity to the sliding sill. These prior rigid sliding sills, which are structurally separate from the car structure, resist deflection to the same extent as the car structure so that frequent binding and sticking may occur at the locations where the deflections are not the same and thereby cause operating difficulties.

As shown, the cross sectional area of the sliding sill members 32 of the sliding sill 18 is sufficient to withstand the longitudinal compression and tension loading adapted to be applied thereon at the couplers. Moreover, the cross section area is arranged and distributed with respect to the length of the sliding sill members 32 to achieve a minimum modulus of rigidity at least in a vertical direction so that the sill members 32 are rendered flexible and comforable to the vertical car deflections.

In this connection, it is to be noted that as described above the guide members or angles 64 are structurally connected to the railway car so as to be deflectable therewith. Therefore, upon deflection of the guide members 64, the sliding sill members 32 which are confined therein and have the low modulus of rigidity are sufficiently flexible to conform to the deflections of the car body and the guide members 64 so as to be freely slidable relative to the car body.

The cushioning arrangement 21 operatively connecting the car body underframe 11 to the sliding sill 18 includes generally the cushioning device 22 and top means 71 and 72 fixed to the sliding sill 18 and underframe 11, respectively. The cushion device 22 may be of a fluid or resilient type or a combination thereof which, upon impact in either direction at the couplers 19 contracts for a selected length of travel under the force of impact and absorbs during its travel a portion of the energy of impact sufficiently to protect the lading and the car body from damage.

In the preferred form of the invention there is employed a hydraulic cushion unit having a travel of between about 20 to 40 inches, preferably 30 inches, and during which travel the resisting force remains approximately constant for each increment of travel thereof, at least after the initial travel. A hydraulic cushion unit having the desired characteristics and which may be advantageously employed with the present invention is disclosed in U.S. Patent No. 3,035,827 dated May 22, 1962, to which reference is made for a more detailed description.

The cushion 22 (FIG. 6) comprises essentially a fluid filled cylinder 73, a fluid displacement means 74 telescopically arranged with respect to the cylinder 73, and a fluid metering means (not shown). Upon impact to the follower plates 75 and 76 fixed to the fluid displacement means 74 and cylinder 73, respectively, the fluid displacement means 74 and the cylinder 73 telescope relatively to each other to displace fluid from one end of the cylinder to the other at a rate controlled by the metering means (not shown) which is arranged to maintain a substantially constant resisting force for each increment of travel of the cushion device. After the force of impact has been dissipated, spring means 77 disposed between the follower plates 75 and 76 is operative to return the cushion device to its original extended or neutral position.

The cushion device 22 is disposed in a cushion pocket 78 formed by a cut-out 78a in the top cover plate 27 in the center sill 12 and includes a base plate 79 disposed and fixed between the center sill side plates 24. The base plate 79 is located to position the longitudinal axis of the cushion device 22 in substantially the same plane as the neutral axes N of the sliding members 32.

The underframe stop means 72 include upper and lower stop lugs 81 and 82 respectively located at each end of the pocket and contact the respective ones of the cushion followers 75 and 76 when the cushion device 22 is in its extended or normal position. The upper and lower stop lugs 81 and 82 may be fixed as by welding to a top plate 80 and the base plate 79. The top plate 80 is supported on and fixed to the guide angles 64.

The stops 81 and 82 are preferably formed with bearing surfaces 83 of substantially equal cross-sectional area which are arranged to abut the follower plates 75 and 76 equidistantly on either side of the center thereof.

The sliding sill stop means 71 include transverse channels 84 and 86 fixed between the sliding sill members 32 so as to be movable therewith. Projecting longitudinally from the channels 84 and 86 are transversely spaced vertical side guide plates 88 which serve to guide and maintain the cushion device unit 22 in substantial alignment with the center line of the car underframe 11. Vertical reinforcing plates 101 fixed between the respective inner walls of the guide plates 88 and the inner walls of the sliding sill members 32 provide a support for the guide plates 88 and additional reinforcement is provided by vertically spaced horizontal plates 91. Enclosing the cushion arrangement is a cover assembly 92 suitably detachably secured to the underframe 11 as by blots 92a (see FIGS. 1 and 8).

From the foregoing description of the sliding sill 18 and the cushioning arrangement 21 which operatively connects the former to the underframe 11, it should be readily apparent that because the sliding sill 18 is only slidable mounted on and is not positively structurally attached to the underframe 11 substantially all of the stresses created upon initial impact (prior to the completion of the cushion travel), at the couplers 11 is assumed by the structural components of the sliding sill 18. As hereinbefore described the resilient draft cushion means 47 at the couplers 19 serves to reduce the draft stresses. However, as is well known, the buff impact forces encountered in train operation are greater than those resulting from draft impact.

These greater buff created stresses are particularly prevalent during switching and humping operations when the cushion underframe car is at the head end of a line of cars. Under these conditions the stationary line cars to which the cushioned underframe car is attached from in the nature of a solid abutment such that the sliding sill 18 is held substantially fixed at its coupled end. Hence, upon coupling of another car to the uncoupled end of the car at relatively high buff impact speeds, the buff force may result in compression loading tending to cause failure of the sliding sill.

In accordance with the present invention the sliding sill 18 is constructed to relieve the compression loading on the sliding sill by the provision of a single stress relieving means which is operative to absorb a portion of the buff impact energy transmitted through the sill upon impact at either one of the couplers 19. This is accomplished, as shown, by forming the sliding sill 18 as sections 93 and 94 of which each section supports one of the couplers 19. The sections 93 and 94 are connected to each other by the tie means 96 permitting lengthwise movement of the sections 93 and 94 relative to each other between a maximum spaced position and an abutting position assumed upon buff impact.

Disposed between the sections 93 and 94 are yieldable resilient cushion means 97 which upon contraction of the sill sections toward each other from the normal maximum spaced position to the abutting position serve to absorb a portion of the buff impact force causing the contraction.

The tie means 96 includes a pair of tie rods 98 each of which are conveniently disposed within one of the spacers 99 formed between the cushion guide plates 88 and the sliding sill members 32. The tie rods 98 are slidably supported at each end by the pair of vertical plates 101 fixed across the space 99. Advantageously, the horizontal reinforcing plates 89 and 91 are vertically spaced to accommodate the tie rods 98 therebetween. Limiting the normal maximum spacing of the sections 93 and 94 are nuts 102 threaded to the ends of the tie rods 98 and abuttable against the vertical plates 101.

In the preferred form shown the yieldable resilient cushion means 97 comprises cushion pad assemblies 103 slidably disposed about the tie rods 98. The cushion pad assemblies 103 each include a plurality of resilient pads 104 of rubber or the like disposed between spaced follower plates 105 engageable with the opposing tie load support plates 101. Upon impact in buff at either end under conditions of train operation wherein the other of the sliding sill sections is not moved concurrently therewith such as when the latter sill section is held stationary, the cushion pad assemblies 103 are operative to absorb a portion of the energy of the impact during the length of travel thereof between the maximum spaced positive and abutting positions of the sill sections 93 and 94.

In view of the fact that the stresses created by buff impact are greater than those in draft impact as heretofore discussed, it is generally found necessary to provide a buff stress relieving cushion device having a length of travel somewhat greater than that of the draft stress relieving cushion means to achieve the required energy absorbing capacity. This increase travel in buff can result in undesirable or excessive run-in and run-out of train line slack during train action.

To minimize the amount of cushion travel and the train line slack and thereby also maintain the lengthwise normal limit spacing of the sliding sill sections 93 and 94 at a minimum, in accordance with the present invention, the sliding sill sections 93 and 94 may be arranged to utilize a portion of the energy absorbing capacity of the cushion device 22. This is accomplished as shown by arranging the sections 93 and 94 on opposite ends of the cushion device so that in the neutral or normal cushion position the stop channel 84 fixed to the section 93 abuts the follower plate 75 and the stop channel 86 fixed to the section 94 abuts the follower plate 76.

Upon relative movement of the sliding sill sections 93 and 94 toward each other upon impact the stop channels 84 and 86 are operative to retract the cushion device 22 therebetween to the extent of the distance of the spacing between the abutting 106 and 107 of the sill sections 93 and 94. As heretofore described, the cushion device 22 is preferably of the type having an approximate constant resisting force for each increment of travel thereof. This approximate constant resisting force during the initial portion of the sliding sill to its abutting position is greater than the initial resisting force of the resilient pad assemblies 103 because the resilient pad assemblies 103 are characterized by a resisting force which varies from a minimum during the initial portion of its travel and reaches the maximum resisting force at the latter portion of its length of travel. This characteristic of the resilient cushion pad assemblies 103 yields an energy absorbing capacity over its full length of travel which is generally less than that of the substantially constant force type hydraulic cushion for a given length of travel. It should be apparent that with the arrangement disclosed that during the period at which the resisting force or energy absorbed by the resilient cushioning means is at its minimum, the initially greater resisting force of the substantially constant force cushion device 22 is utilized. When the resisting forces of the resilient cushion means 103 reach a resisting force equal to or greater than that of the hydraulic cushion device 22 at the latter portion of the travel, this greater resisting force is also utilized to absorb a portion of the energy of impact. In this manner the length of travel required to obtain the desired or required energy absorbing capacity to relieve the compression loading on the sliding sill members 32 is maintained at minimum and thereby reducing the amount of train line slack.

The utilization of a portion of the energy absorbing capacity of the cushion device 22 to protect the sliding sill 18 from excessive compression loading does not interfere with the normal function of the cushion device 22 in providing lading and car body protection. Assuming the application of draft impact at one of the couplers 19, it is readily apparent that the sliding sill sections 93 and 94 are maintained in the maximum spaced relationship as limited by the length of the tie rods 98. The initial draft impact transmitted through the length of the sliding sill 18 is absorbed by the cushion draft gears 47. Concurrently, the sliding sill sections 93 and 94 move in the direction of the draft force relative to the underframe for the full length of travel of the cushion device 22. During this period the sliding sill stop channel 84 or 86 remote from the coupler 19 on which the draft force is applied is operative to retract the cushion device 22 against the opposing underframe stops 81 and 82 so that the cushion unit 22 absorbs a portion of the impact energy sufficient to provide the lading and car body protection. Upon dissipation of the impact energy the spring 77 is operative to return the cushion device 22 and the sliding sill 18 to the normal or neutral positions.

Shock impact in buff tending to cause lading or car body damage most frequently occurs when a running car is being coupled to a line of stationary cars as encountered during the switching and humping operations. Under these circumstances, the running car being coupled is detached at one end thereof such that the sliding sill sections 93 and 94 are freely slidable relative to the underframe 11 when the other end is being coupled to the stationary line of cars. The shock impact applied at the coupler 19 is transmitted from one section to the other via the return spring 77 and the resilient cushion pads 103 such that there is substantially little if any relative movement between the sliding sill sections 93 and 94. The sliding sill 18 thus freely moves lengthwise relative to the car body so that the channel stop 84 and 86 engaging the corresponding follower retracts the cushion device 22 between the opposing underframe stop lugs 81 and 82. In this manner a portion of the energy of impact is absorbed by the cushion device 22 at a rate sufficient to protect the lading and car body from damage. Upon dissipation of the impact energy the sliding sill 18 is returned to its neutral position by way of the return spring 77.

Referring now to FIG. 6A, there is shown a second embodiment of a tie arrangement 296 which is constructed and arranged to tie the sill sections 93 and 94 together in a manner permitting a relative lengthwise movement of the latter as heretofore described while at the same time relieving the stresses through the sill sections 93 and 94 encountered in both buff and draft. When the tie arrangement 296 is employed, the yoke 46 and the draft cushion gear carried by the latter as shown in FIG. 4 is eliminated and the coupler shank is directly pivotally supported by means of the coupler pin which is supported by the coupler housing. As will be more fully described below, the elimination of the draft cushion gear 47 is made possible by provision of a resilient draft stress relieving means incorporated in the tie arrangement 296 along with the buff stress relieving cushions 97 described above in connection with FIG. 6.

The tie means 296 is similar to the tie means 96 of FIG. 6 including a pair of tie rods 298 slidably supported at each end by the pair of vertical plates 101 fixed across the space 99 formed between the cushion guide plate 88 and the respective sliding sill members 32. Disposed between the longitudinally opposite inner ones of the vertical plates 101 and slidably mounted on the respective tie rods 298 are the buff cushion pad assemblies 103 and the follower plates 105 which serve to absorb the buff stresses imparted to the sliding sill members as described above.

The tie rod 298 may be of greater length than the tie rods 98 so that the terminal end portions thereof each extend beyond the respective outer ones of the vertical support plates 101. Disposed between the outer ones of the vertical support plates and the respective nuts 299 threaded on the ends of the tie rods 298 is a resilient draft stress relieving arrangement 300. The resilient draft stress relieving arrangements 300 each include spaced follower plates 301 between which there are disposed a plurality of resilient pad assemblies 302 formed of rubber and separated by metallic discs 303. The pad assemblies 302 and metallic disc 303 are slidably disposed on the respective terminal ends of the tie rods 298 similar to the buff cushion pad assemblies 103.

Upon the application of a draft impact force at either one of the couplers carried by the respective outer ends of the sliding sill sections 93 and 94, the sill section to which the draft impact force is applied moves longitudinally outwardly relative to the other of the sill sections, which at least initially, remains substantially stationary. During the initial relative longitudinal movement of the sill sections the tie rods are held substantially stationary by the stationary sill section, whereupon the inner ones of the vertical tie rod support plates of the movable sill section compress the cushion pads 302 against the adjacent nuts 299. As the compressive forces are applied on the nuts 299, the tie rods 298 are slidably drawn in the direction of the draft force so that the nuts 299 on the other end of the tie rods 298 compress the cushion pads 302 against the inner ones of the vertical support plates 101 of the stationary sill section. As the draft cushion pads 302 compress, the spacing between the sill sections is increased so that the buff stress relieving cushions 97 remain extended and inoperative. In this manner, the draft cushion pads 302 on each of the ends of the tie rods 298 are operative during the travel thereof to the fully compressed position to absorb a portion of the draft impact energy and thereby relieve the tension stresses through the sill sections 93 and 94. The total length of travel of the draft cushion pad assemblies 302 is generally less than the travel of the buff cushion pad assemblies 97.

When the draft cushion pad assemblies 302 have completed the travel to the fully compressed position, the sliding sill sections 93 and 94 slide lengthwise of the underframe as a unit and compress the substantially constant force cushion unit 22 as heretofore described so that the unit 22 is operative to provide lading and car body protection.

The use of the solid section sliding sill members 32 permits ready alignment of the neutral axis of the sliding sill with the line of draft of the couplers. A minimum of mounting space is required for the sliding sill thus permitting ready use thereof in low level flat car structures without interference with efficient use of the open deck of the car for piggyback operations. These advantages lead to greater latitude in underframe design. In this respect it will be noted that the guide angles 64 function to confine the sill members 32 thereby providing greater column stability. This feature permits the use of solid section sliding sill members in relatively long cars as the confinement of the sill members is readily structurally provided for and any deficiency in column stability is overcome.

It should be apparent that the application of the forces thus transmitted to the underframe occurs at the localized points of the attachment of the stops 81—81 and 82—82 to the underframe 11 and along a plane which is displaced from the neutral axis N of the center sill 12. This manner of transmitting the impact forces to the center sill 12 may cause failure in bending if the cushion unit 22 is located in proximity to the point where maximum bending occurs under a maximum load.

As hereinbefore described, the cushion unit 22 is disposed so that the longitudinal axis thereof lies substantially along the line of draft C and in line with the impact axis. When thus located, as illustrated in FIGS. 1 to 8 it may be necessary to provide the top cover plate 27 of the center sill 12 within the cut-out 78a to accommodate the hydraulic cushion unit. The cut-out 78a creates a weakened sector in the center sill structure which, if subject to severe stresses such as bending, may result in failure in this location. To obviate the necessity of additional reinforcement structure in this area which would render the car construction more cumbersome and heavier, in accordance with the present invention the hydraulic cushion unit 22 is disposed to interact between the sliding sill and the center sill. Thus, the impact forces are transmitted to the center sill 12 at a location remote from that at which the maximum bending moment of the car occurs. The maximum bending moment of the car may be calculated in the well-known manner. The bending moment curve B shown in FIG. 13 superposed on the schematically illustrated cushion underframe car structure 10 is approximately typical and reveals that the point of maximum bending MB occurs slightly to the right of the lengthwise center of the car.

In the illustrated car 10 the load applied on the car was selected so as to obtain the maximum bending moment under any conditions of loading. To this end, assuming a predetermined car length, say about 90 ft., the car was assumed to be loaded with semi-trailers X and Y which are also loaded to rated capacity. The semi-trailers X and Y were selected to be of different standard lengths, 40 and 45 ft., now available. As illustrated, the semi-trailers were hitched to the car by means of trailer hitches H. The loaded trailers X and Y thus supported on the car 10 apply the load forces FX and FY at the point of contact of the respective semi-trailer wheels W with the floor of the underframe and at the point of support of the semi-trailers with the trailer hitches. This loading arrangement resulted in the approximate maximum bending moment diagram or curve C superposed on the car.

As mentioned above, the point of maximum bending MB on the bending moment curve B occurs somewhat to the right of center. In order to avoid the transmission of the impact force to the underframe 11 at this point, the cushion unit 22, as shown, is wholly disposed to the right of the maximum bending moment MB. Thus, the impact force is transmitted to the underframe at a point below which maximum bending occurs. Of course, if the cushion unit 22 were to be disposed to the left of the maximum bending point MB, a similar result is achieved. When the cushion units are thus disposed to the right or left of the lengthwise center, the sliding sections 93 and 94 of the sliding sill will be formed of sill members 32 of corresponding unequal lengths.

An example of versatility of use of the sliding sill structure 18 is illustrated in the car structures shown in FIG. 9 and FIGS. 10–14.

The car 110 of FIG. 9 is of low level piggyback construction including a conventional box section center sill 111 with the top cover plate 112 thereof defining the longitudinal center portion of the deck. The plate 112 is attached to longitudinal intermediate deck plates 113 which in turn are attached to generally Z-shaped upstanding side sills 114. The various plates and side sills are supported by longitudinal stringers 115, transversely paired cross ties 116, transversely paired cross bearers 117, and gusset plates 118 to which the cross ties and bearers are attached.

The basic sliding sill structure 18 described above is operatively mounted along the cover plate 112 with the guide angles 64 suitably secured thereto. The extent to which the sliding sill structure projects above the deck is insufficient to interfere with conventional tractor and trailer operation therealong. The type of cushion mounting arrangement described above can be readily accommodated by the car 110.

In FIGS. 10–12 there is shown a flat car 210 in which the floor 211 is substantially planar and at a level greater than that of either of the cars illustrated in FIGS. 1–8 and FIG. 9, say, for example, of about 41 inches above the track. The flat car 210 comprises generally an underframe 212 including a center sill 213, bolsters 214, cross bearers 215, and end sills 216. Fixed to the ends of the cross bearers 215 and bolsters 214 are side sills or rub rails 217.

The center sill 213 is of generally box-like structure including laterally spaced webs 218 across the lower edges of which there is fixed a bottom cover plate 219. Fixed across the upper edges of the side webs is a top cover plate which may form the central portion of the substantially planar floor 211. The floor 211 is fixed along the side edges to the side sills 217. It is to be understood, of course, that the floor 211 may also be formed with side sheet sections similar to the floor structure illustrated in FIGS. 1–8 wherein the top cover plate of the center sill is a separate sheet to which the side floor sheets are attached along the inner edges thereof. When the latter structure is employed the cover plate may be considered as forming part of the planar floor surface. Also, as shown, the center sill 213 is formed with a fishbelly construction in which the intermediate section thereof disposed between the trucks is of greater depth than the end sections.

As above described, the height of the floor of the flat car is greater than that of the floors shown in the embodiments of FIGS. 1–8 and FIG. 9 to the extent that the line of draft D of the coupler 19 is considerably vertically displaced downwardly therefrom. Thus, as shown in particular in FIGS. 11 and 12, the sliding sill 18 is supported within the confines of the center sill 213 and substantially below the level of the floor.

As heretofore described, the sliding sill 18 is supported such that the neutral axes N of the sill members 32 lie substanitally along the coupler line of draft C. To this end, there is provided along each of the side webs 218 supporting members 220 which may be formed from angle members extending lengthwise of the car 210. The supporting angle members 220 are each arranged so that a leg 221 forms a horizontal supporting surface. The other of the legs may be fixed to the bottom cover plate 219 in the narrower end section and to the spaced transverse reinforcing plates 222 in the intermediate section thereof, as shown in FIGS. 11 and 12 respectively. In the locations where the reinforcing plates 222 extend upwardly toward the underside of the floor or top cover plate the reinforcing plates may be cut-out along the upper corners to accommodate the angle member 220 and the sliding sill member 32 supported thereon.

As shown, the sliding sill structure 18 of the present invention permits the formation of recesses along the longitudinal center of the car floor 211 to accommodate the fifth wheel stanchions therein in the collapsed position. The recesses may be of different depths depending on the width of the collapsed stanchion to be stored therein. The stanchions in the erect operative position are generally in the form of a triangular support and in the collapsed position are constructed such that the struts assume as closely as possible a substantially horizontal position.

In the illustrated car of FIG. 10 there is shown a pair of recesses 225A and 225B of different widths to accommodate different width stanchions. It is to be understood that the two different width stanchions are used for the purpose of illustrating the formation thereof in the cushion underframe car construction of the present invention. However, in commercial use the car will generally be formed with recesses of equal size and dimension.

As shown in FIGS. 10 and 12, to accommodate a stanchion of a relatively large width the sides 226 of the recessed portions are in substantial alignment with the side webs 218. In connection with the transverse spacing of the side webs 218 it should be mentioned that they may be spaced a maximum lateral distance apart as determined by the spacing of the truck wheels 23 and turning radius thereof. The base of the wider recess 225, as shown, may be formed integral with the vertical side walls 226 which may be fixed at the upper ends thereof to the flooring 211. Suitably supporting the recess base 227 is a horizontal plate 228 which extends between the center sill side webs 218 and is located so as to form a top guiding enclosure for the sliding sill members 32 which are disposed adjacent the respective side webs and supported on the angle members 220. To facilitate the sliding movement of the sill members 32 wear plates 229 are fixed to the underside of the reinforcing plate 228, side webs 218 and horizontal legs 221. The depth of the recess 225A is such that the stanchion in the collapsed position thereof does not extend above the level of the floor to interfere with the tractors or trailers passing thereover.

The narrower recess 225B, as shown in FIG. 12, is formed by spacing the side walls 226 so that the respective outer faces thereof lie inwardly of the inner face of the sliding sill members 32. The depth of the recess 225B is such that the bottom wall 227a lies slightly above the cross pieces 70 which may be used to interconnect the laterally spaced sill members 32. To provide reinforcement, longitudinally spaced strap members 230 may be fixed to the underside of the recess bottom wall 227a. The straps 230 may be formed with downwardly depending legs 231 which may be fixed at the lower ends thereof to the angle members to form enclosures for the sill members 32.

What is claimed is:

1. A cushioned underframe railway vehicle comprising an underframe formed as a beam structure capable of assuming the vertical loads to be carried along the length of said underframe and being deflected along the length thereof, a sliding sill extending lengthwise of said underframe and including laterally spaced sill members substantially detached from each other along the lengths thereof intermediate the ends, laterally spaced guide means fixed to said underframe and deflectable therewith confining respective ones of said sliding sill members at least against substantial vertical movement relative to said underframe and guiding said sliding sill for lengthwise movement of said underframe whereby said guide means acts on said sliding sill members in such a way that said sliding sill members will readily deform vertically in accordance with the deformation of the underframe but are constrained against excessive vertical deformation due to impacts, couplers carried on the opposite ends of said sliding sill, means mounting said couplers between said sliding sill members adjacent the ends thereof and interconnecting said sliding sill members for simultaneous movement lengthwise of said underframe, said sliding sill members each being of a length and having a cross section including a depth dimension of substantially lesser depth than said beam structure so that said sill members conform to the deflections of the said underframe and said guide means, said sliding sill members having a total solid cross sectional area capable of assuming the tension and compression loading longitudinally applied to said sliding sill at said couplers, and cushion means interposed for interaction between said underframe and sliding sill.

2. The invention as defined in claim 1 wherein lengthwise spaced cushion stop means are fixed between said laterally spaced sliding sill members intermediate the ends thereof, and said cushion means is disposed between said cushion stop means.

3. The invention as defined in claim 1 wherein said underframe includes a center sill and a floor extending laterally therefrom at a level below the coupler line of draft, and wherein said guide means are fixed to said floor so that said sliding sill is supported on said floor and thereby to support said couplers along the line of draft.

4. The invention as defined in claim 1 wherein said underframe includes a center sill having a neutral axis displaced below the coupler line of draft, and a floor extending laterally from said center sill at a level above the coupler line of draft, and wherein said guide means are formed on said center sill so that said sliding sill members guided by said guide means support said couplers along the line of draft.

5. The invention as defined in claim 4 wherein said underframe includes a center sill formed as a box section, said box section including laterally spaced and vertically disposed side webs and a top cover plate fixed to the upper edges of said side webs, and wherein said guide means each includes means substantially aligned with said vertical webs so as to guide said respective sliding sill members adjacent said side webs whereby the lateral space between said detached portions of said sliding sill members permits the location of fifth wheel stands therebetween.

6. A cushion underframe railway car comprising an underframe including a center sill having a depth dimension so that said neutral axis is displaced below the coupler line of draft, a sliding sill, said sliding sill comprising a pair of laterally spaced and longitudinally extending sill members substantially detached from each other intermediate the lengths thereof, said sliding sill members each having a cross section configuration and a depth of substantially lesser depth than said center sill and rendering said sliding sill vertically flexible along the length thereof so as to conform to the variable vertical flexures occurring lengthwise of said underframe and being sufficient in cross sectional area to be capable of assuming tension and compression loading applied longitudinally thereto, coupler means disposed between said sill members adjacent the opposite ends thereof, means mounting said coupler means on said sliding sill members so that the longitudinal axes of said couplers lie substantially in the plane defined by the longitudinal neutral axis of said sliding sill at the ends of said sliding sill, and guide means on said underframe guiding said sliding sill for lengthwise movement relative to said underframe of said car so that said couplers lie substantially on the coupler line of draft, said guide means including means constraining said sliding sill members against substantial vertical deflection relative to the varying vertical deflections of said underframe during lengthwise movement of said sliding sill, whereby said guide means acts on said sliding sill members in such a way that said sliding sill members will readily deform vertically in accordance with the deformation of the underframe but are constrained against excessive vertical deformation due to impacts.

7. A cushioned underframe railway vehicle comprising an underframe formed as a beam structure capable of assuming the vertical loads to be carried along the length of said underframe and being deflected along the length thereof, a sliding sill extending lengthwise of said underframe and including two endwise spaced sections movable lengthwise of said beam structure, means interconnecting said sliding sill sections for relative movement to each other and to said underframe from a spaced neutral position to a contracted and extended position upon buff and draft impact, respectively, said sections each including laterally spaced sill members substantially detached from each other along the lengths thereof intermediate the ends, laterally spaced guide means fixed to said underframe and deflectable therewith confining respective ones of said sliding sill members at least against substantial vertical movement relative to said underframe and guiding said sliding sill for lengthwise movement of said underframe whereby said guide means acts on said sliding sill members in such a way that said sliding sill members will readily deform vertically in accordance with the deformation of the underframe but are constrained against excessive vertical deformation due to impacts, couplers carried on the remote ends of said sliding sill sections, means mounting said couplers on said remote ends between said sliding sill members, each of said sliding sill members being of a length and having a cross section including a depth dimension of substantially lesser depth than said beam structure so that said sliding sill members conform to the deflections of the said underframe and said guide means, said sliding sill members having a total solid cross sectional area capable of assuming the tension and compression loading longitudinally applied to said sliding sill at said couplers, and cushion means interposed for interaction between said underframe and said sliding sill sections when said sliding sill sections move relative to each other and said underframe upon buff impact at said couplers.

8. The invention as defined in claim 7 wherein said cushion means has a total travel greater than said endwise spacing of said sliding sill sections so as to be operative upon buff impact at said couplers to absorb a portion of impact through the length of said sliding sill during movement of said sill sections relative to each other from said neutral position to said contracted position, and to permit further conjoint movement of said sliding sill sections in said contracted position relative to said underframe and thereby absorb further energy of impact.

9. The invention as defined in claim 7 wherein said means interconnecting said sill sections for relative movement to each other includes shock absorbing means operative during movement of said sliding sill sections relatively to each other from said neutral to said abutting position to absorb a portion of the buff and draft impact applied at said couplers.

10. The invention as defined in claim 7 wherein said means interconnecting said sill sections for relative movement to each other includes shock absorbing means operative during movement of said sliding sill sections relative to each other from said neutral to said abutting position to absorb a portion of the buff impact applied at said couplers and wherein said cushion means has a total travel greater than said endwise spacing of said sliding sill sections so as to be operative upon buff impact at said couplers to absorb with said shock absorbing means a portion of the impact through the length of said sliding sill during movement of said sill sections realtive to each other from said neutral to said abutting position, and to permit further conjoint movement of said sliding sill sections in said abutting position relative to said underframe and thereby absorb further energy of impact.

References Cited by the Examiner
UNITED STATES PATENTS

| | | | |
|---|---|---|---|
| 1,735,424 | 11/1929 | Duryea | 213—8 |
| 1,860,548 | 5/1932 | O'Connor | 105—454 |
| 1,997,170 | 4/1935 | Egen | 213—8 |
| 2,039,269 | 4/1936 | Barrows | 213—8 |
| 2,155,533 | 4/1939 | Dwyer | 105—454 |
| 2,305,518 | 12/1942 | Dean | 213—8 |
| 2,752,048 | 6/1956 | Fillion | 213—8 |
| 2,803,353 | 8/1957 | Meyer et al. | 213—8 |
| 2,906,414 | 9/1959 | Couch | 213—8 |
| 3,006,483 | 10/1961 | Baillie et al. | 213—8 |
| 3,042,223 | 7/1962 | Austgen | 213—8 |
| 3,050,320 | 8/1962 | Clejan | 105—368 |
| 3,081,716 | 3/1963 | Szczepanik | 213—8 |
| 3,102,497 | 9/1963 | Candlin et al. | 105—368 |

MILTON BUCHLER, *Primary Examiner.*

LEO QUACKENBUSH, ARTHUR L. LA POINT,
*Examiners.*

D. E. HOFFMAN, *Assistant Examiner.*